United States Patent
Pintar et al.

(10) Patent No.: US 9,901,849 B2
(45) Date of Patent: Feb. 27, 2018

(54) PROCESS FOR REMOVING CATALYST FINES FROM A LIQUID STREAM FROM A FIXED BED REACTOR

(71) Applicant: UOP LLC, Des Plaines, IL (US)

(72) Inventors: Daniel James Pintar, Hoffman Estates, IL (US); Dorothy Richmond, La Grange Park, IL (US); John J. Jeanneret, Western Springs, IL (US); Richard Hoehn, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 728 days.

(21) Appl. No.: 14/303,864

(22) Filed: Jun. 13, 2014

(65) Prior Publication Data
US 2015/0360151 A1 Dec. 17, 2015

(51) Int. Cl.
*B01D 29/52* (2006.01)
*B01D 29/56* (2006.01)
(Continued)

(52) U.S. Cl.
CPC ............ *B01D 29/56* (2013.01); *B01D 29/52* (2013.01); *B01J 8/006* (2013.01); *B01J 8/0453* (2013.01);
(Continued)

(58) Field of Classification Search
CPC .. B01D 24/002; B01D 24/10; B01D 24/4884; B01D 29/52; B01D 29/56; B01D 35/12; B01D 39/06; B01D 39/2072; B01J 8/0453; B01J 8/0457; B01J 8/006; B01J 2208/00716; B01J 2208/00769;
(Continued)

(56) References Cited

U.S. PATENT DOCUMENTS

| 4,033,870 A | * | 7/1977 | Parquet | B01D 35/12 |
| | | | | 210/103 |
| 6,291,603 B1 | * | 9/2001 | Glover | B01D 39/06 |
| | | | | 422/216 |

(Continued)

FOREIGN PATENT DOCUMENTS

| EP | 1636393 B1 | 8/2012 |
| GB | 1090294 A | 11/1967 |

OTHER PUBLICATIONS

3M, "Metal catalyst-carbon complex reduction with a self-contained, reclaimable, filter pack," Product Brochure—Customer Application Brief, pp. 1-4.

(Continued)

*Primary Examiner* — Matthew O Savage

(57) ABSTRACT

A process for filtering a liquid stream from a fixed bed reaction zone in order to remove catalyst fines contained in the stream. The effluent stream is passed to a filtering section which may contain at least two filtering vessels. Each filtering vessel includes at least two differently filtering sections, each section designed to collect differently sized particles. If a pressure drop occurs in one of the filtering vessels, it may be taken offline to remove the filtering sections and recover the metal in the particles collected on the filtering sections. The other filtering vessel can remain online to allow the filtering process to be continuous. Metal on the catalyst fines may be recovered.

9 Claims, 3 Drawing Sheets

Figure 1:
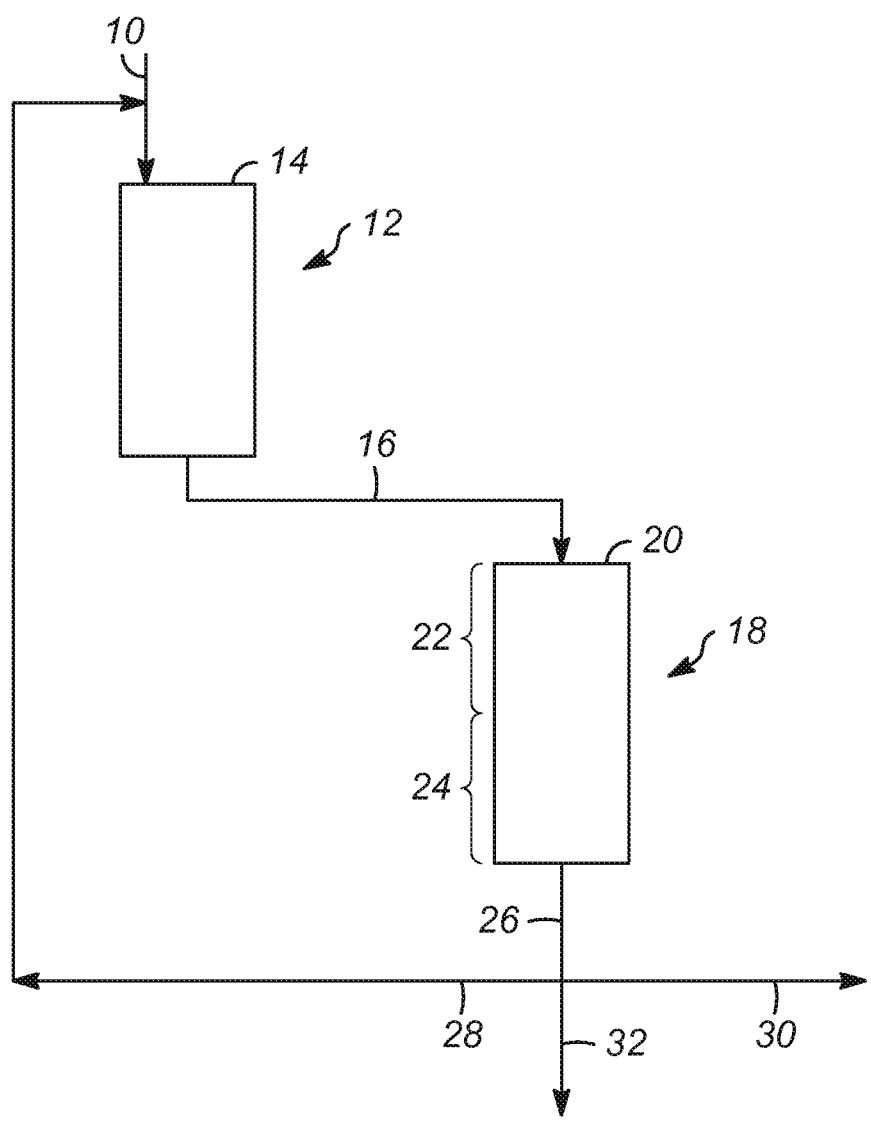

(51) Int. Cl.
    *B01J 8/00*     (2006.01)
    *C22B 7/00*     (2006.01)
    *B01J 8/04*     (2006.01)
    *C10G 31/09*    (2006.01)
    *C10G 49/00*    (2006.01)
    *C10G 53/02*    (2006.01)

(52) U.S. Cl.
    CPC ............ *B01J 8/0457* (2013.01); *C10G 31/09* (2013.01); *C10G 49/002* (2013.01); *C10G 53/02* (2013.01); *C22B 7/009* (2013.01); *B01J 2208/00716* (2013.01); *B01J 2208/00769* (2013.01); *C10G 2300/4031* (2013.01); *Y02P 10/214* (2015.11)

(58) Field of Classification Search
    CPC ...... C10G 31/09; C10G 49/002; C10G 53/02; C10G 2300/706; C10G 2300/4031
    See application file for complete search history.

(56) References Cited

U.S. PATENT DOCUMENTS

| | | |
|---|---|---|
| 6,359,018 B1 | 3/2002 | O'Rear et al. |
| 6,797,033 B2 | 9/2004 | Doubrava et al. |
| 7,473,406 B2 | 1/2009 | Jasra et al. |
| 7,655,135 B2 | 2/2010 | Havlik et al. |
| 8,344,199 B2 | 1/2013 | Knottenbelt et al. |
| 8,636,896 B2 | 1/2014 | Gueret et al. |
| 2004/0225085 A1* | 11/2004 | Glover .................. B01J 8/0469 526/67 |
| 2011/0284371 A1 | 11/2011 | Jin et al. |
| 2013/0095013 A1 | 4/2013 | Banno et al. |
| 2013/0144099 A1 | 6/2013 | Tasaka et al. |

OTHER PUBLICATIONS

Rubow et al., "Sintered porous metal filtration systems for petroleum refining applications," Mott Corporation Conference Proceedings (2002), pp. 1-12.

Du et al., "Pilot plant test of removing catalyst fines from FCC slurry with sintered stainless steel . . . ," Petroleum Processing and Petrochemicals (2009), 40(11), 36-39.

Kalen et al., "Filtering Effluent From a Catalytic Cracker," Chemical Engineering Progress (1973), 69(6), 67-71.

Kumar, "Catalyst Recovery Filtration Systems", Product Description, retrieved online Apr. 8, 2014 <www.http://www.kumarfilter.com/catalyst-recovery-prod.php>.

* cited by examiner

PROCESS FOR REMOVING CATALYST FINES FROM A LIQUID STREAM FROM A FIXED BED REACTOR

FIELD OF THE INVENTION

This invention relates to processes for the removing catalyst fines from a liquid stream from a reaction zone, and more particularly to a process for filtering a reactor effluent to recover catalyst fines and metal associated therewith.

BACKGROUND OF THE INVENTION

Petroleum refining and petrochemical processes include reaction zones that contain catalysts used to promote various chemical reactions. For example, hydrocracking, hydrotreating, naphtha reforming, naphtha isomerization are all process that use catalysts to promote the different chemical reactions associated therewith. These catalysts comprise, among other compounds, metals, typically noble or precious metals.

When the catalysts are spent, they may be processed to recover the noble metals. Since the metals are expensive, the loss of even a small amount of catalyst metal can be costly for a refiner. Therefore, refiners desire to maximize the recovery of the catalyst metals to minimize any losses.

The catalyst pellets are typically contained in one or more beds within the reaction zone. During the loading and the handling of these beds, catalyst fines are typically generated. Once the reactor is brought back on line, the catalyst fines migrate through the reaction zone and are carried out with the liquid flowing through the reactor. Not only does this result in a loss of catalyst fines, it can result in a loss of processing fluid, if the startup fluid is the fluid to be processed. Additional catalyst fines can be generated merely by the operation of the reaction zone. These catalyst fines can be carried along with the liquid effluent and lost into downstream equipment. Thus, any catalyst metal lost during operation as a result of catalyst fines generation will lower metals recovery and increase the capital loss for the refiner.

It is known to recover catalyst in various Fisher-Tropsch reactions in which the synthesis catalyst particles are in a slurry or processing fluid. For example, U.S. Pat. Pub. No. 2013/0144099 discloses the use of filters to capture the synthesis catalyst particles and separate same from the hydrocarbon oil. Another process for filtering an effluent stream from a Fisher-Tropsch reactor is disclosed in U.S. Pat. No. 8,344,199. The process disclosed in U.S. Pat. No. 8,344,199 uses two filter sections to avoid a pressure drop associated with filtering the effluent stream. However, in both of these references, various filters are separated, thus creating problems associated with changing the filters when they become saturated. Thus, it is believed that these processes fail to fully address minimizing downtime for a reactor. Furthermore, while presumably effective for their intended uses, these processes are not believed to be readily suited to recover catalyst fines from an effluent from a fixed bed reactor.

As mentioned above, catalyst fines are especially a problem during start-up periods for the fixed bed reactors after the beds have been re-loaded with new catalyst. Accordingly, during the start-up of the reactor, there will be an initial surge of catalyst fines in the liquid passing through the reactor. Typically, to avoid a pressure drop downstream created by the catalyst fines, the start-up liquid (or flush liquid) is used as a "once through" liquid. Once the liquid is substantially void of catalyst fines and any other impurities, the reaction process can be started.

One drawback with such a process is the loss of the reactor being online. Indeed, it can take between four to eight hours before the flush liquid is substantially free from catalyst fines. However, and more importantly, the flush liquid that is used is typically the processing stream. While the "once through" fluid can be recovered and used in other, less desirable processes, it would be more beneficial for a refiner to be able to recycle the flush liquid (which comprises the processing stream) back to the reactor.

Therefore, there is a need for an effective and efficient process to recover the catalyst fines from a liquid stream from a fixed bed reaction zone.

Additionally, there is a need for such a filtering process that can minimize, if not eliminate any downtime for the reaction zone associated with the filtering process.

SUMMARY OF THE INVENTION

A new process for the recovery of catalyst fines from liquid from a fixed bed reaction zone has been developed.

In one aspect, the present invention provides a method for the recovery of catalyst fines and metal from the liquid.

An exemplary embodiment of the present invention according to this aspect may be characterized as a process for recovering catalyst fines and metals from a stream which includes: passing at least a portion of a stream from a fixed bed reaction zone to a filtering zone, wherein the portion of the stream comprises liquid and catalyst fines and wherein the filtering zone includes at least one filtering vessel, each filtering vessel comprising a first filter section and a second filter section; and, passing the portion of the stream from the fixed bed reaction zone through the first filter section and the second filter section of the at least one filtering vessel, the second filter section being downstream from the first filter section. The particles collected by the first filter section of each filtering vessel are different in size than the particles collected by the second filter section in that filtering vessel.

In some embodiments, the particles collected by the first filter section are larger than the particles collected by the second filter section. Additionally, the filtering zone may include at least two filtering vessels. In some embodiments, the at least two filtering vessels are arranged in parallel. In some embodiments, the at least two filtering vessels are arranged in a lead-lag configuration.

In some embodiments the process further includes monitoring for a pressure drop within the at least one filtering vessel and removing the at least one filtering vessel from the process when a pressure drop occurs. The process may further include passing the portion of the stream from the fixed bed reaction zone to a second filtering vessel when the at least one filtering vessel has been removed from the process. In some embodiments, removing the at least one filtering vessel and passing the portion of the stream from the fixed bed reaction zone to the second filtering vessel are performed automatically based upon a detection of a pressure drop in the first filtering vessel.

In yet further embodiments, the process includes recovering a metal from the first filter section, the second filter section, or both.

Another embodiment of the present invention according to this aspect may be characterized as a process for recovering metals and catalyst fines from a stream which includes: passing a stream to a filtering zone, wherein the stream comprises liquid and catalyst fines, and wherein the filtering zone includes a plurality of filtering vessels, each filtering vessel comprising a first filter section and a second filter section; passing the liquid and catalyst fines through the first filter section and the second filter section of the first filtering vessel; and, passing the liquid and catalyst fines through the first filter section and the second filter section of the second filtering vessel. The particles collected by the first filter section of each filtering vessel are larger in size than the particles collected by the second filter section in that filtering vessel, and at least one of the first filter section and the second filter section of each filtering vessel collects the catalyst fines.

In some embodiments, the first filtering vessel and the second filtering vessel are arranged in parallel. In still other embodiments, the first filtering vessel and the second filtering vessel are arranged in a lead-lag configuration.

The process may further include monitoring for a pressure drop within the first filtering vessel and removing the first filtering vessel from the process when a pressure drop occurs. Additionally, the process may include monitoring for a pressure drop within the second filtering vessel and removing the second filtering vessel from the process when a pressure drop occurs.

In some embodiments, the process includes removing the first filtering vessel from the process to recover metal in the catalyst fines, and the passing of the liquid and catalyst fines to the second filtering vessel occurs only when the first filtering vessel has been removed from the process. The process may include monitoring for a pressure drop within the first filtering vessel and further include automatically removing the first filtering vessel from the process based upon a detection of a pressure drop in the first filtering vessel. It is further contemplated that the process includes monitoring for a pressure drop within the second filtering vessel.

In some embodiments, the process includes replacing the first filter section of the first filtering vessel with a new first filter section and replacing the second filter section of the first filtering vessel with a new second filter section. It is further contemplated that the process includes restoring a flow of liquid and catalyst fines to the first filtering vessel after the first filter section and the second filter section have been replaced.

In another aspect, the present invention provides a process to minimize the start-up flush associated with a fixed bed reactor.

In addition to the above mentioned embodiments, an exemplary embodiment of a process according to this aspect may be characterized as a process for minimizing a startup time for a reaction zone which includes: passing a flush liquid through a fixed bed reaction zone, wherein the flush liquid collects catalyst fines within the fixed bed reaction zone; passing the flush liquid to a filter zone to remove the catalyst fines from the liquid, wherein the filtering zone includes a plurality of filtering vessels, each filtering vessel comprising a first filter section and a second filter section; and, recycling the flush liquid to the fixed bed reaction zone. The recycled flush liquid is a reactant in the fixed bed reaction zone.

It should be appreciated that the above mentioned aspects and embodiments can be combined and that additional embodiments will be appreciated by those of ordinary skill in the art based up the details of the invention as set forth in the following detailed description of the invention.

DETAILED DESCRIPTION OF THE DRAWINGS

Figure 2:
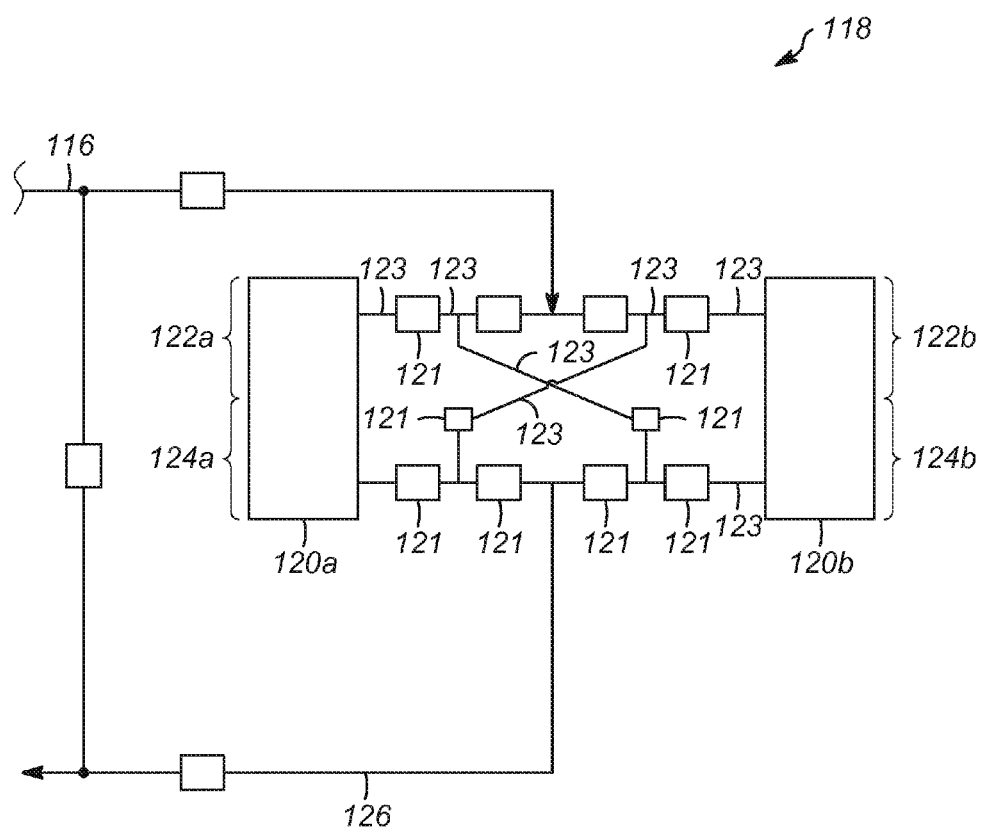
Figure 3:
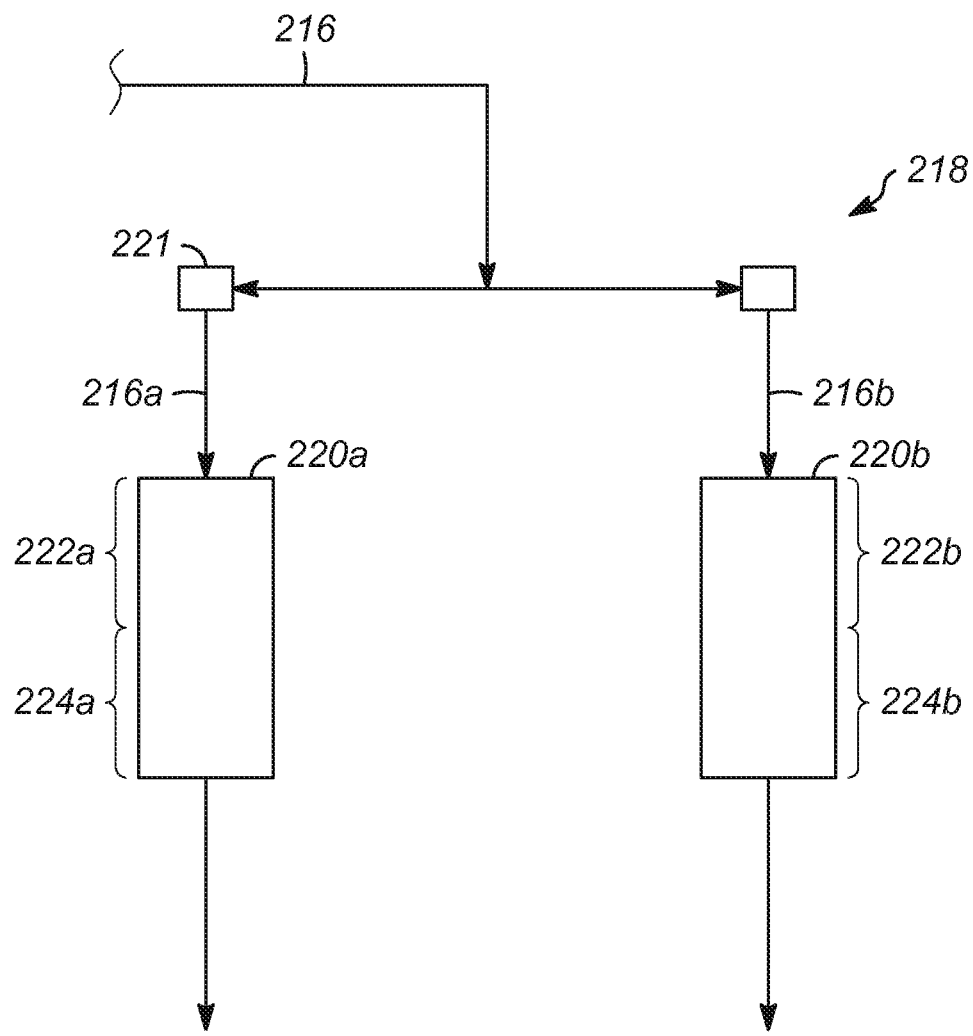

The drawings are simplified process diagrams in which:
FIG. 1 depicts a process for the recovery of catalysts fines from a reactor effluent stream;
FIG. 2 depicts a filtration zone according to one or more embodiments of the present invention; and,
FIG. 3 depicts another filtration zone according to one or more embodiments of the present invention.

DETAILED DESCRIPTION OF THE INVENTION

As mentioned above, a new process has been developed for the recovery of catalyst fines from liquid from a fixed bed reaction zone. The process includes passing liquid from a fixed bed reaction zone through a filtering zone having one or more filtering vessels. Preferred configurations include at least two filtering vessels in a lead lag or parallel configuration, which allow one vessel to be taken offline, while others remain online. Furthermore, in order to maximize the time online for the filtering vessels, the vessels include at least two filtering sections, each retaining differently sized particles, including catalyst fines. These processes according to the present invention allow a refiner to recover the catalyst fines, and, thus, recover the metals associated therewith. Additionally, these processes according to the present invention allow a refiner to minimize, and potentially eliminate, the use of a start-up flush that is required because of the catalyst fines in the liquid stream.

Accordingly, an exemplary embodiment of the present invention is shown in FIG. 1 in which a feed stream 10 is passed to a reaction zone 12. The reaction zone 12 include one more reactors 14. When it is desired to process the feed stream, each reactor 14 is operated at the appropriate conditions (temperature, pressure, etc.) for the intended chemical reaction, such as, for example hydrocracking, hydrotreating, naphtha reforming, naphtha isomerization. However, during start-up when the system is flushed, typically with the liquid of the feed stream, the reactor may be operated at a reduced temperature and also may be operated at a reduced pressure.

As is known, the reactor 14 contains a plurality of various beds, each holding catalyst pellets which promote the desired chemical reactions as the liquid feed stream flows over the pellets. For example, a hydro-treating reactor is disclosed in U.S. Pat. No. 8,323,476, the entirety of which is incorporated herein by reference.

The catalysts typically comprise metal on a support material such as alumina or silica. The metals may comprise platinum, palladium, gold, silver, iron, cobalt, nickel, molybdenum, tungsten, tin, or other metals. As will be appreciated, some of these are expensive metals, and the loss of a small amount of same can be very costly for a refiner. Therefore, it is desirable to maximize the recovery of the catalyst fines.

As previously mentioned, catalyst fines are often created from the movement of catalyst beds into or out of the reactor 14. As liquids move throughout the reaction zone 12, the liquids will carry away the catalyst fines. This is especially problematic during a start-up period of the reactor 14, when there will be a surge of catalyst fines. Thus, any liquid streams 16 from the reaction zone 12 will include catalyst fines and it is undesirable for the catalyst fines to be passed downstream. Furthermore, since the catalyst fines often include one or more precious metals, it is also desirable to increase the recovery of the catalyst fines (which contain the precious metals).

As shown in FIG. 1, according to one or more embodiments of the present invention, in order to remove the catalyst fines in the liquid stream 16 from the reaction zone 12, the liquid stream 16, or at least a portion there of, is passed to a filtering zone 18. Although not depicted, the liquid stream 16 can be passed first to a separation zone, containing a separator vessel or a fractionation column, to separate out some of the components in the stream from the reactor. Subsequently, a portion of the liquid stream 16 could then be passed from the separation zone to the filtering zone 18.

Additionally, the filtering zone 18 can be disposed in process piping that is not typically used, for example, in piping associated with the start-up of the reactor 14. More specifically, as mentioned above, a flush is typically required every time the reactor 14 is reloaded because of catalyst fines that have been created from the loading and unloading of catalyst beds or because of other impurities in the process piping and vessels. Therefore, many reactor configurations include piping and valves that allow the flush fluid to be removed from the process. Under the conventional methods, once the fluid is relatively free from catalyst fines and other impurities, the valves and piping will route the flow of the liquid stream back to the reaction zone 12, or to another processing zone. Therefore, in some embodiments of the present invention, the filtering zone 18 is disposed in a start-up line or a recycle line, or some other bypass line.

Returning to FIG. 1, the filtering zone 18 comprises at least one filtering vessel 20. Preferably, the filtering zone 18 includes more than one filtering vessel 20 (see, e.g., FIGS. 2 and 3). Each filtering vessel 20 includes a first filtering section 22 and a second filtering section 24. The second filtering section 24 is downstream from the first filtering section 22. The first and second filtering sections 22, 24 collect particles that are differently sized.

For example, the first filtering section 22 will collect larger particles, allowing smaller particles to flow through along with the liquid. The second filtering section 24 will collect the smaller particles, allowing the liquid to pass through. As will be discussed more below, the liquid may then proceed to further processing. It is further contemplated that additional filtering sections are disposed in the filtering vessels and especially preferred that each filtering section collects particles smaller than the particles collected by the filtering sections upstream therefrom.

A preferred material for the first and second filter sections is ceramic pellets which have a high internal porosity, such as the products available from Crystaphase Technologies, Inc., located in Houston, Tex. US. In accordance with a preferred embodiment, the first filtering section 22 will comprise a plurality of pellets having a pores of a first size, and the second filtering section 24 will comprise a plurality of pellets having pores of a second size that is smaller than the first size. Other filtering materials may be used, for example, membrane filters, sand filters, and other similar filter materials.

The use of a larger filtering section upstream of the smaller filtering section within the filtering vessel 20 will mitigate pressure drop, as well as increase the length of time that the filtering vessel 20 is online. More specifically, by separating the filtering vessel 20 into at least two sections 22, 24, with the first filtering section 22 having larger pores than the second filtering section 24, the resultant pressure drop associated with passing the liquid into and through the pores of the filtering material is lowered.

With respect to the collection of the solid materials from the liquid, the configuration also allows for the filtering sections 22, 24 to saturate more slowly. The slower the filtering sections 22, 24 saturate with particles, the longer the filtering vessel 20 can be online and filter liquid. Furthermore, a slower saturation time also allows more time for the filtering vessel 20 to be taken offline in reaction to the saturation and pressure drop. Finally, a slower saturation rate means that saturation will occur less frequently.

Eventually, however, a filtering section 22, 24 of the filtering vessel 20 will become saturated, and the vessel 20 will need to be taken offline. Once offline, the filtering material in the first and second filtering sections 22, 24 can be removed from the filter vessel 20 and, if desired, the metals in the catalyst fines can be recovered. If, for example, the filtering materials are aluminum based materials, the aluminum can be digested, and subjected to metals reclamation processes, allowing the metals to be recovered. The recovery of metals from the catalyst fines is known and is not necessary for an understanding and practicing of the present invention.

Since many of the reactors strive to continuously produce streams, it would be desirable to provide one or more process which allow for continuous filtering of the liquid, even if a filtering section of a filtering vessel becomes saturated. Accordingly, in some embodiments of the present invention, at least two filtering vessels are used.

As shown in FIG. 2, a liquid stream 116 is passed to a filtering zone 118 which contains two filtering vessels 120a, 120b. Each filtering vessel 120a, 120b includes a first filtering section 122a, 122b and a second filtering section 124a, 124b like the filtering vessel 20 in the embodiment of FIG. 1. In this embodiment, the filtering vessels 120a, 120b are in a lead-lag configuration.

In the lead-lag configuration, the liquid stream 116 is passed to the first filtering vessel 120a, or the lead vessel, through a series of valves 121 and piping 123. From the first filtering vessel 120a, the liquid stream is passed to the second filtering vessel 120b, or the lag vessel. Again, this is done with valves 121 and piping 123. After passing through the second filtering vessel 120b, the filtered stream can be removed from the filtering zone 118 through a stream 126. If the first filtering vessel 120a becomes saturated the first filtering vessel 120a may be taken offline by directing the flow of the liquid stream 116 to the second filtering vessel 120b through the valves 121 and the piping 123. The filtering material in the filtering sections 122a, 124a of the first vessel 120a may be removed, allowing the metal in the catalyst fines collected by same to be recovered. New filtering material can be disposed within the first filtering vessel 120a, and the flow can be returned to the first filtering vessel 120a. Alternatively, the entire first filtering vessel 120a could be removed, and a third filtering vessel disposed in the place of the first filtering vessel 120a. Additionally, it is not necessary to return the flow to the first filtering vessel 120a (or third filtering vessel) after the filtering material has been removed from same. Rather, the second filtering vessel 120b could become the "lead" vessel, with the first vessel 120a (or new third vessel) becoming the "lag" vessel. Other variables are possible and the exact operation of this configuration is not intended to be limiting.

Turning to FIG. 3, an alternative configuration is shown in which a liquid stream 216 is passed to a filtering zone 218 which contains two filtering vessels 220a, 220b. Each filtering vessel 220a, 220b includes a first filtering section 222a, 222b and a second filtering section 224a, 224b like the filtering vessel 20 in the embodiment of FIG. 1. In this embodiment, the filtering vessels 220a, 220b are in a parallel configuration.

In this configuration, the liquid stream 216 is split into two portions 216a, 216b, with each filtering vessel 220a, 220b receiving a split portion 216a, 216b. If, for example, the first filtering vessel 220a becomes saturated, or otherwise experiences a pressure drop, the split 216a directed to that filtering vessel 220a may by passed to the other filtering vessel 220b, for example by closing a valve 221. The saturated filtering vessel 220a may be taken offline and the filtering sections 222a, 224a may be removed so that the catalyst metal may be recovered. The filtering sections 222a, 224a can be replaced, or a third filtering vessel can be disposed in the place of the first filtering vessel 220a. Once a filtering vessel is in place, it may be brought online and a portion of the effluent flow 216a may be directed to the filtering vessel 220a.

In either configuration depicted in FIGS. 2 and 3, or in another configuration, the use of the at least two filtering vessels allows for a continuous filtering of the reactor effluent to minimize the amount of metal lost in the catalyst fines.

In a most preferred embodiment, the vessels are taken offline or put online automatically. In such a process, the vessels are monitored for a pressure drop. If a pressure drop is detected, the flow of effluent to that filtering vessel may be stopped, for example with a computer controlling a valve. A signal to an operator could indicate that the filtering vessel is offline and no longer receiving effluent. The filtering sections could be removed from the vessel and the metal in the catalyst fines recovered through known processes.

Returning to FIG. 1, the liquid from the reaction zone 12 passes out of the filtering zone 18 via a line 26. In some embodiments of the present invention, the liquid may be flush liquid that is desired to be processed in the reactor 14. Accordingly, a recycle line 28 may be used to pass the liquid back to the reactor. Although not shown, additional equipment may be used to remove other impurities (for example water).

Additionally as mentioned above, other impurities may still exist in the liquid. Accordingly, a line 32 may be used to remove the flush fluid from the process and passed or sent to another, less desirable process. However, since the catalyst fines have been removed, it is believed that the overall time for removing the flush fluid from the process is less compared to a stream in which the catalyst fines have not been removed.

In some instances it may be desirable to filter the liquid stream 16 when the desired reactions are occurring in the reaction zone 12. Accordingly, the filtered liquid may be passed via a line 30 from the filtering zone 18 to further downstream processing.

The processes according to the present invention provide a refiner the ability to recover metal from catalyst fines. The processes according to the present invention also provide a refiner with the ability to minimize, and possibly eliminate, the need to discard flush fluid necessary utilized during the start-up of the reactor.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understating the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for recovering catalyst fines and metals from a stream, the process comprising:
    passing a stream through a fixed bed of catalyst pellets in a fixed bed reaction zone of a reactor, wherein the catalyst pellets remain in a fixed position as the stream passes through the fixed bed;
    passing at least a portion of the stream from the fixed bed reaction zone to a filtering zone, wherein the portion of the stream comprises liquid and catalyst fines and wherein the filtering zone includes at least one filtering vessel, each filtering vessel comprising a first filter section and a second filter section; and,
    passing the portion of the stream from the fixed bed reaction zone through the first filter section and the second filter section of the at least one filtering vessel, the second filter section being downstream from the first filter section;
    wherein particles collected by the first filter section of each filtering vessel are different in size than particles collected by the second filter section in that filtering vessel.

2. The process of claim 1 wherein particles collected by the first filter section are larger than particles collected by the second filter section.

3. The process of claim 2 wherein the filtering zone includes at least two filtering vessels.

4. The process of claim 3 wherein the at least two filtering vessels are arranged in parallel.

5. The process of claim 3 wherein the at least two filtering vessels are arranged in a lead-lag configuration.

6. The process of claim 1 further comprising:
    monitoring for a pressure drop within the at least one filtering vessel; and,
    removing the at least one filtering vessel from the process when a pressure drop occurs.

7. The process of claim 6 further comprising:
    passing the portion of the stream from the fixed bed reaction zone to a second filtering vessel when the at least one filtering vessel has been removed from the process.

8. The process of claim 7 wherein removing the at least one filtering vessel and passing the portion of the stream from the fixed bed reaction zone to the second filtering vessel are performed automatically based upon a detection of a pressure drop in the first filtering vessel.

9. The process of claim 1, further comprising:
    recovering a metal from the first filter section, the second filter section, or both.

* * * * *